June 22, 1965     B. BORISOF     3,190,201
PHOTOGRAPHIC COMPOSING DEVICE
Filed July 19, 1961     3 Sheets-Sheet 1
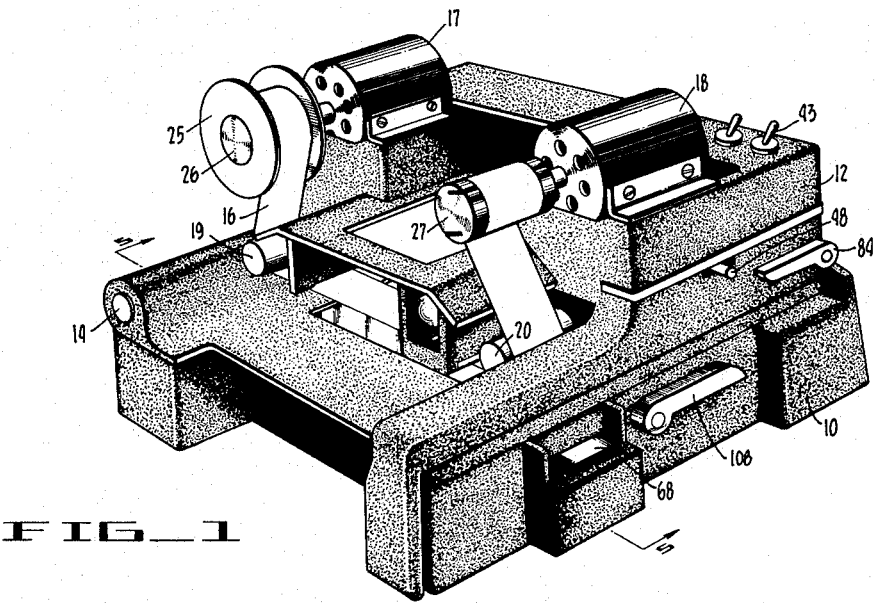
FIG_1
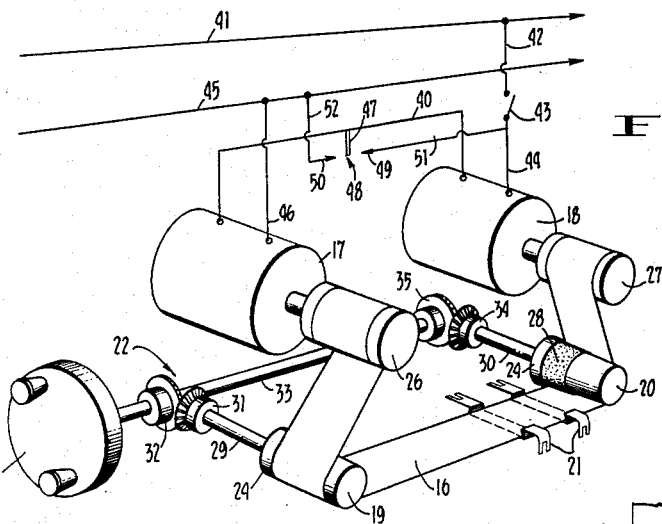
FIG_2
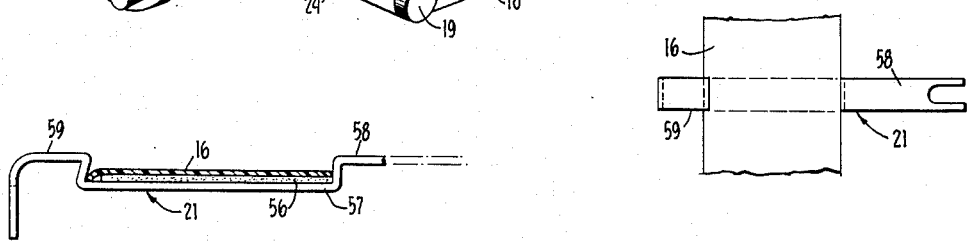
FIG_3     FIG_4

June 22, 1965          B. BORISOF          3,190,201
PHOTOGRAPHIC COMPOSING DEVICE
Filed July 19, 1961          3 Sheets-Sheet 2
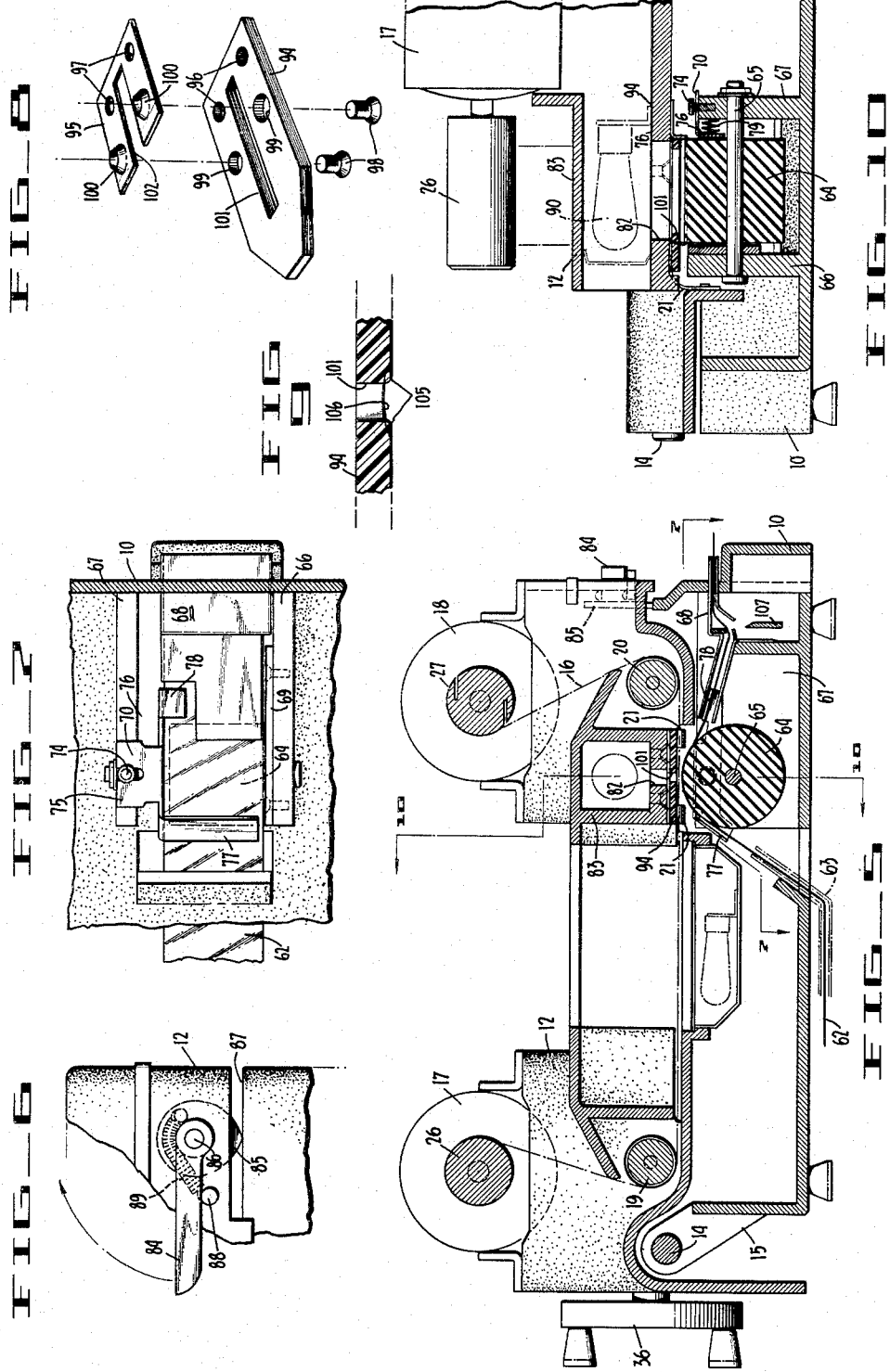

June 22, 1965  B. BORISOF  3,190,201
PHOTOGRAPHIC COMPOSING DEVICE
Filed July 19, 1961  3 Sheets-Sheet 3
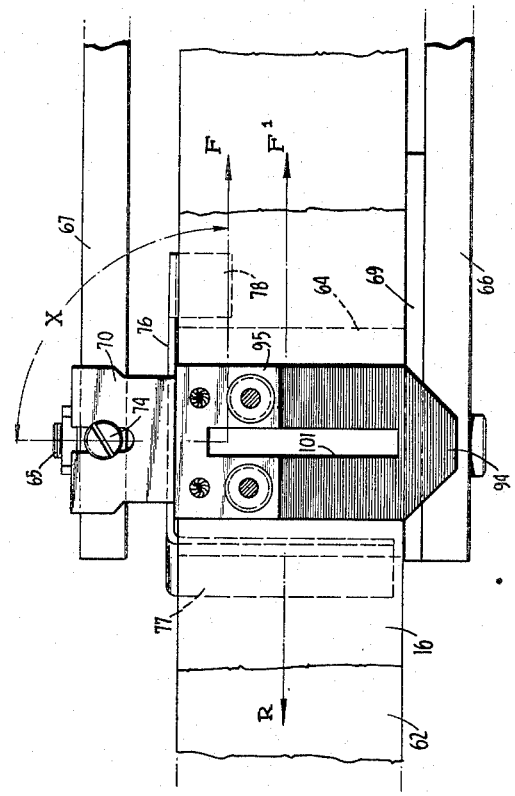
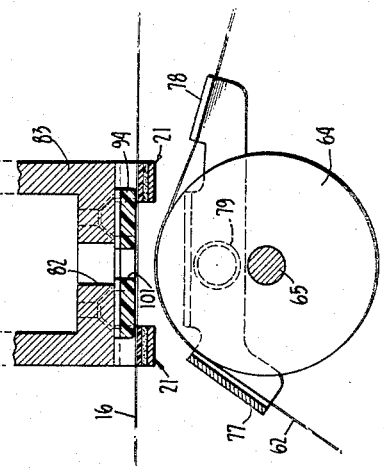

United States Patent Office 3,190,201
Patented June 22, 1965

3,190,201
PHOTOGRAPHIC COMPOSING DEVICE
Bernard Borisof, Chicago, Ill., assignor, by mesne assignments, to Friden, Inc., San Leandro, Calif., a corporation of Delaware
Filed July 19, 1961, Ser. No. 125,164
8 Claims. (Cl. 95—4.5)

My invention relates to a photographic composing device and more particularly to an improved means for facilitating contact printing operations.

In photographic composing devices of the type employing the contact printing principle, the letters, numerals and characters to be printed are carried in a transparent form on a film negative. In order to effect the printing of a desired letter, numeral or character, the selected letter is first position relative to a light source, the film is then moved into contact with a photosensitive paper or film and an exposure is caused to take place. The degree of sharpness of the printed image depends to a great extent upon proper contact of the film negative with the photosensitive paper.

In the past, devices of this type utilized rollers between which the film negative and paper passed in superimposed relationship, one such roller serving as the backing roller and the other roller, or rollers, serving as pessure rollers which cause contact of the film with the paper. Normally, the relationship of the pressure rollers to the backing roller is such that the film negative may be moved independently of the paper to enable the selection of letters to be printed. Following the positioning of the film for the desired letter, the pressure rollers are adjusted to effect contact of the film with the paper. To be efficient, the pressure rollers must be axially parallel with each other and with the backing roller as the contact is made. It is also necessary that a coplanarity be maintained between the pressure rollers and backing roller to prevent misalignment of the film with the paper. In the manufacture and assembly of the rollers, the critical tolerances and adjustments necessary to attain the parallel and coplanar relationship therebetween has been found to be quite costly.

In order to maintain absolute unison of movement of master film and photosensitive strip, I use a friction drive between the two strips. The master film may be driven manually or otherwise, and when pressed against the photosensitive strip, a like movement of the photosensitive strip is effected. To achieve this, it is essential that the friction force between the master film and photosensitive strip be greater than the total of all the forces restraining the movement of the photosensitive strip. The frictional resistances to rotation of the backing roller and to movement of the strip through the precision alignment guide system are together less than the frictional driving force.

It is, therefore, an object of the present invention to provide a photographic composing device with an improved pressure plate which is simple in design and easily and quickly installed or replaced.

Another object of the present invention is to provide an improved means for causing full and complete contact of a film negative with a print paper.

A further object of the present invention is to provide an improved pressure means for maintaining a film negative in printing contact with a photosensitive paper during the exposure sequence.

Another object of the invention is to provide one improved means for maintaining a master film strip and photosensitive strip in intimate contact at the area of exposure in order to achieve sharp reproductions and to enable movement of the two strips in unison.

A further object of the present invention is to provide a contact printing device with an improved means for enabling the movement of a master film strip and photosensitive strip in unison and in precise alignment so that as a line of characters is reproduced from the master film strip onto the photosensitive strip, the characters will be aligned within less than .001 inch deviation from a common base line regardless of appreciable variations in the widths and flexibility of the strips.

Another object of the present invention is to provide a contact printing device with improved means for maintaining ultimate frictional contact of a film strip with a photosensitive strip for unity of movement of the two strips and to effect precise alignment of the characters in each line of characters when the film strip partially overlaps the photosensitive strip during the composition of each of a plurality of lines of characters.

A still further object of the present invention is to provide a contact printing device with an improved means for controlilng the movement of a film strip in either direction past a light source with no more than .001 inch deviation in the tracking of one edge of the film strip.

Other objects and advantages will become apparent from the following description of a preferred embodiment, as illustrated in the accompanying drawings in which:

FIG. 1 is a plan view in perspective of the device embodying the invention.

FIG. 2 is a diagrammatic view in perspective of the film control mechanism and the wiring schematic therefor.

FIG. 3 is an elevational view of the film guide with the film shown in cross-section.

FIG. 4 is a plan view of the film guide shown in FIG. 3.

FIG. 5 is a transverse sectional elevational view of the device embodying the invention, the view being taken on the plane indicated by the line 5—5 in FIG. 1.

FIG. 6 is a detail of the control means for effecting contact of the film with the photosensitive paper.

FIG 7. is a fragmentary sectional plan view of the base portion of the device showing the backing roller and film guide associated therewith, the view being taken on the plane indicated by lines 7—7 in FIG. 5.

FIG. 8 is a disassembled view of the pressure plate.

FIG. 9 is a fragmentary transverse sectional elevational view in detail of the slot in the pressure plate.

FIG. 10 is a fragmentary longitudinal sectional elevational view of the device showing the relationship of the pressure plate with the backing roller, the view being taken on the plane indicated by lines 10—10 in FIG. 5.

FIG. 11 is an enlarged fragmentary sectional elevational view of the backing roller and pressure plate and the guides associated therewith as they are viewed in FIG. 5.

FIG. 12 is an enlarged fragmentary showing of the mechanism viewed in FIG. 10.

FIG. 13 is a diagrammatic plan view of the pressure plate, backing roller and the film and photosensitive strip therebetween, the view indicating the forces which are active during the movement of the strips.

The invention is shown as embodied in a photographic composing device of the type illustrated in FIG. 1, having base portion 10 and carriage 12 hingedly supported for rocking movement on the base portion 10 by means of shaft 14. As illustrated in FIG. 1, the rearward elevation and left end elevation, as well as the top of the device, is open to view, the left end elevation being that shown on the right. The shaft 14 is supported in a pair of spaced brackets, similar to bracket 15 (FIG. 5), integrally formed on base portion 10 and adjacent its forward and rearward ends, is secured against endwise movement in the carriage 12. Thus, shaft 14 serves as a hinge about which the carriage 12 is rocked from a normally raised to a lowered position on the base 10.

The control mechanisms for the film strip 16 (FIGS. 1 and 2) are mounted within the carriage 12 and include electric motors 17 and 18, tapered, or truncated, conical rollers 19 and 20, film strip guides 21 and the manual control mechanism, generally indicated at 22. Film strip 16 bears the letters, numerals and characters which are to be photographically reproduced and at its one end is secured on reel 25 removably secured on an arbor 26 carried by the shaft of motor 17 coaxial therewith. At its other end, the film strip 16 is folded over and inserted in an axially disposed chordal slot in arbor 27 secured on, and coaxial with, the shaft of motor 18. Arbors 26 and 27 have a substantially coplanar relationship and parallel axes of rotation. Normally, the rotation of motors 17 and 18 is in opposite directions, as determined by the windings and construction of each motor, so that upon energization of motor 17, reel 25 will turn in a counter-clockwise direction, as viewed in FIG. 1, while the energization of motor 18 will effect a clockwise rotation of arbor 27. The direction of the winding of the film strip 16 on the reel 25 and arbor 27 is so related to the normal direction of rotation of respective motors 17 and 18 that, upon energization of either motor, the film will be wound onto the reel, or arbor, driven by the corresponding motor.

In its movement between reel 25 and arbor 27, the film strip 16 passes over the tapered, or truncated, conical rolls 19 and 20 and is guided in its movement by means of the spaced parallel guide strips 21. The inner edge of the film strip 16 (FIG. 2) rides on the frictional peripheral surface of each of a pair of sleeves, or cylinders, 28, which are preferably of rubber and are fitted and secured on the larger diametrical end portion of the tapered rolls 19 and 20.

As it is moved in either direction, the film strip 16 must be so guided that its course will not change appreciably from the normal path of travel. This requires that the film should wind evenly on either reel and that neither the motor nor manual driving means should introduce misalignment.

Rolls 19 and 20 serve, not only to support the film strip 16 in its movement in one direction or the other, upon energization of motor 17 or 18, but also serve, under control of the manual control mechanism 22, to move the film in either direction. For this purpose, rolls 19 and 20 are secured, respectively, on the outer end of the shafts 29 and 30 suitably supported for rotation within the carriage 12 and having divergent axes. The degree of divergency of the axes of the shafts 29 and 30 is equivalent to the angle of the conical rolls so that the film strip, in its travel from either reel, is substantially parallel with the surface of the rubber sleeve 28 at approximately the point of tangency of the film strip with the sleeve on the corresponding rolls 19 and 20. At its inner end, shaft 29 carries bevel gear 31 enmeshed with bevel gear 32 secured on shaft 33 intermediate the ends thereof. Likewise, shaft 30 carries bevel gear 34, similar to gear 31, enmeshed with bevel gear 35 secured on the inner end of the shaft 33, gear 35 being similar to gear 32. Shaft 33 is suitably journalled in the carriage portion 12, having its outer end extending beyond the right-hand face of the carriage 12 to provide a mounting for wheel crank 36 which is secured thereon. Under certain conditions, as will be later explained, clockwise or counter-clockwise rotation of crank 36 serves to effect movement of the film strip 16 in one direction or the other.

The motors 17 and 18 (FIG. 2) serve two functions, that of selectively controlling rapid longitudinal movement of the film strip 16 in either direction, and that of maintaining the film strip taut during the exposure sequence. Except for the direction of rotation, motors 17 and 18 are identical and are preferably of the series-wound type having their field and armature windings connected in series, one to the other. The series connection between motors 17 and 18 is through line 40, while power is supplied to the motor from power supply line 41 through line 42, switch 43 and line 44 and from power supply line 45 through line 46. Thus, upon closure of the normally open switch 43, the normal operating voltage of each motor is reduced to half of its rated voltage. Upon energization of the motors by this circuit arrangement, the driving force of one motor counteracts that of the other to maintain film strip 16 under tension between rollers 19 and 20. While it is held taut, the inner edge of the film strip 16 (FIG. 2) is in frictional contact with the rubber sleeves 28 on rolls 19 and 20, thereby enabling a manual adjustment of the film by rotation of wheel crank 36 in one direction or the other.

Either motor 17 or 18 may be selectively controlled to effect rapid movement of the film strip 16 in either direction. For this purpose, the movable contact 47 (FIG. 2) of a single-pole double-throw switch 48 is connected to line 40 for engagement with either stationary contact 49 or stationary contact 50. Contact 49 is connected to power supply line 41 through line 51, line 44, switch 43, and line 42, while contact 50 is connected to power supply line 45 through line 52. It, therefore, becomes apparent that upon engagement of movable contact 47 with stationary contact 49 and the closure of switch 43, current to motor 18 is reduced and substantially full line current is provided to motor 17, causing it to become energized to move film strip 16 to the left, as viewed in FIG. 2. Similarly, when contact 47 is rocked into engagement with contact 50, current is reduced to motor 17 and substantially full line current is provided to motor 18, thereby effecting movement of film strip 16 to the right. During the rapid movement of the film strip 16 in one direction or the other, it is held sufficiently taut by the drag of the substantially de-energized motor and the frictional resistance of the rollers 19 and 20 including the manual control mechanism therefor.

Proper alignment of the film strip 16 is maintained by means of structurally similar guide strips 21 (FIGS. 2, 3 and 4) which are positioned intermediate rolls 19 and 20 and are secured on the framework of the carriage 12. Film strip 16 is supported in its travel on a pad 56 of relatively soft material, such as felt, which is secured on the inner surface of the web portion 57 of the channel formed in the guide strip 21, the lateral projections 58 and 59 of which provide mounting means for the guide strips within the carriage 12. One wall of the guide channel is disposed at a right angle to the web portion 57, while the other wall thereof is formed at an acute angle to the web portion to constrain the web within the channel. Upon insertion of the film strip 16 into the guide channel, the acute angular wall of the channel tends to maintain the opposite, or inner, edge of the film strip in contact with the vertical wall of the channel, aided during operation of the device by the tapered sleeve 28 on each of the rolls 19 and 20 (FIG. 2).

The foregoing description, it is believed, will suffice for a complete understanding of the motor-driven and manually-controlled film strip feed mechanism. However, for a more complete description, if desired, reference is to be had to my copending application, S.N. 45,465 filed July 26, 1960 and now abandoned and entitled "System and Apparatus for Feeding and Positioning a Web."

Upon movement of the film strip 16 in either direction, the conical surface of the sleeve 28 on each of the rolls 19 and 20 introduces a creep of the film so that the inner edge of the film (FIG. 2) is maintained against the flange 24 on each of the rolls. Therefore, the guiding of the film at the motive points does not depend on maintaining an exact width of strip. During rapid movement of the film strip, either manually or by motor, when not in contact with the photosensitive strip, the guides 21 positioned between rolls 19 and 20 maintain alignment of the inner edge of the film strip (FIG. 2) within .001 of an inch at the exposure area. Thus, following the engagement of the film strip with the photosensitive strip for the exposure of a character, the character will be accurately aligned with the other characters in the line. Inasmuch as the film strip is not rigid, it can resist only light lateral distubing forces. This combination of guides is unique in that flexible film may be accurately guided within a close tolerance.

The photosensitive paper (FIGS. 5 and 11), upon which images are to be photographically reproduced from the film negative strip 16, is self-contained within a light-proof can, or pack (not shown), positioned exteriorly of the device. The paper pack is removably connected, in a light-proof manner, with one end of chute 63, a portion of which is shown in phantom line in FIG. 5. At its other end, the chute 63 extends angularly upwardly into a suitable aperture in the bottom section of the base portion 10. As the sensitized paper 62 is threaded through the chute 63, it is directed over backing roller 64 which is rotatably mounted on a suitable pin 65 secured in the vertically disposed spaced parallel structural members 66 and 67 of the base portion 10 (FIGS. 5, 7, and 12). From roller 64, paper 62 passes through the discharge chute 68, the open end portion of which extends beyond the wall of the base portion 10.

The guide system for the photosensitive strip must be so effective that the photosensitive strip will not waver from its path .001 inch while it is moved by the master film strip. On the other hand, the lateral forces for guiding the strip must be very light in order that the frictional resistances produced by these guide forces will be at a minimum. Since the strip may be a paper photosensitive strip, large forces would be prohibitive, as the paper would be crushed, torn or jammed. Further, if the strip travel is produced by a light friction drive, the resistance of the guide system must be much less than the drive force. In order to achieve such accurate guidance, a guide yoke 70 is provided to automatically distribute the very lighet guiding forces for maximum advantage to cause one edge of the photosensitive strip to run along a guide bar 69.

Referring now to FIGS. 5, 7, 10 and 12, the course of travel of the sensitized paper 62 corresponds to that of the film strip 16. Proper relationship of the paper with the film is maintained by means of guide yoke 70 which serves to maintain the left end of roller 64 (FIGS. 10 and 12) against plate 69 secured on the inner surface of structural member 66 at 90° to the axis of the roller. As the paper 62 passes over roller 64, guide member 70 is effective to also maintain one edge of the paper against the face of plate 69. To this end, guide member 70 is yieldably supported for movement axially of roller 64 (FIGS. 7, 10 and 12) on the upper edge of the structural member 67 by the engagement of shoulder screw 74 in the open end slot in a flange 75 projecting laterally at a right angle to a bar 76 intermediate the ends thereof. At its one end, bar 76 is provided with a lateral projection 77 which overlies the sensitized paper 62, extending across the paper for substantially its entire width. The projection 78, shorter in length than projection 77, extends laterally from the other end of bar 76, overlying the edge portion of the paper 62, tending to cause the paper to conform to the surface of roller 64 in passing thereover. Normally, the guide 70 is urged to the left in FIGS. 10 and 12 by means of a compression spring 79 interposed between the bar 76 and the inner face of the structural member 67, axially parallel with pin 65 on the center line of the screw 74. The width of the paper 62 is slightly greater than the length of the roller 64, so that the spring 79 resiliently maintains the surface of the respective end portions of the bar 76 of guide member 70 in contact with one edge of the paper either side of the axis of the roller 64, thereby urging the opposite edge of the paper into contact with the face of the plate 69 while permitting some freedom of axial movement of roller 64 on pin 65.

With this arrangement, any movement of the sensitized paper 62 to the left, as viewed in FIGS. 5 and 11, tends to rock the guide member 70 clockwise, as viewed in FIG. 7, by virtue of the frictional contact of the edge of the paper with the surface of the right end portion of bar 76, thereby increasing the force tending to hold the opposite edge of the paper in contact with the guide plate 69. Conversely, upon movement of the sensitized paper 62 to the right, as viewed in FIG. 7, the frictional contact of the one edge of the paper 62 with the surface of the left end portion of bar 76 tends to rock guide member 70 counterclockwise about screw 74 (FIG. 7) to increase the tendency of the bar 76 to maintain the other edge of the paper 62 in contact with guide bar 69. It, therefore, becomes apparent that regardless of the direction of travel of the strip 62, the guide member 70 maintains one edge of the strip against the fixed bar 69. Any tendency of the strip to deviate from its normal path of travel, 90° to the axis of the roller, whether due to any irregularity in the strip, variation in width, vibration, or an unbalanced acceleration, is immediately and automatically corrected. Inasmuch as one edge of the strip is against the guide bar 69 at the beginning of the operation, and is so guided that it always remains in contact with the bar, the system is stable.

In order to photographically reproduce a selected letter, numeral or character on the film strip 16 onto the sensitized paper 62, the area of the film bearing the selected letter is first moved into position relative to the rectangular aperture 82 (FIGS. 5 and 10) in the lower wall of the exposure lamp housing 83, which is an integral part of the carriage 12. The lever 84 is then rocked clockwise (FIG. 6) to permit carriage 12 to rock clockwise (FIG. 5) under its own weight about shaft 14, thereby moving the film strip 16 into contact with the sensitized paper 62. Normally, the film strip 16 is maintained out of contact with the paper 62 by means of cam 85 (FIGS. 5 and 6) secured on one end of the shaft 86 adjacent the inner surface of the wall of the carriage 12. Shaft 86 extends through the wall of the carriage, having lever 84 secured on the other end thereof. As the lever 84 is rocked clockwise, the high point of the cam 85 is moved out of engagement with the top surface 87 of the wall of base portion 10 and the carriage 12 is permitted to drop. Cam 85 is normally urged by the relatively strong spring 89 to the position shown in FIG. 6 wherein lever 84 is in engagement with stop pin 88 and carriage 12 is in its raised condition. As the carriage 12 is dropped to move the film strip 16 into contact with the sensitized paper 62, the exposure lamp 90, shown in phantom line in FIGS. 5 and 10, is turned on and the wheel crank 36 is then rotated to move film strip 16 to the right (FIG. 5) sufficiently to expose the entire letter to be reproduced. Following the exposure, the lamp 90 is turned off, the carriage 12 is raised by releasing lever 84 to the urgency of the spring 89 and the next letter is moved into position for the succeeding print operation.

During the photographic or printing sequence, intimate contact of the film strip 16 for its entire width with the sensitized paper 62 is necessary for a quality reproduction. To this end, a pressure plate 94 (FIGS. 5, 8, 9, 11 and 12) is employed. In the embodiment shown, pressure plate 94 is of a thickness of about one-eighth inch and is preferably molded of a fluoro carbon resin, such as Teflon, having an extremely low coefficient of friction and limited flexibility. However, the plate may be molded or otherwise formed of any thermoplastic material. At its one end, plate 94 is secured to a relatively thin metal spacer plate 95 by any suitable means, such as rivets which are passed through apertures 96 in plate 94 and similar apertures 97 in plate 95, with the heads of the rivets countersunk in and below the lower surface of the plate 94. To secure plate 95 and, therefore, plate 94 in position on the lower surface of the lamp housing 83, a pair of screws 98 are passed through suitable clearance holes 99 in plate 94 and into apertured extrusions 100 in plate 95 to be threaded into corresponding countersunk tapped holes in the lower wall of the lamp housing 83. Thus, it can be seen that with the extrusions 100 secured in position in the mating countersunk holes within the lower wall of the housing 83, any dislocation of the plates 94 and 95 is precluded. After the plate 94 is secured in place, the free end portion of the plate may be flexed to an extent determined by the thickness of the spacer plate 95.

Intermediate its width, the plate 94 is provided with a rectangular aperture 101, having a width of approximately three-sixteenths of an inch and a length sufficient to expose the largest letter, numeral or character on the film strip 16. In its secured position on plate 94, plate 95 covers approximately one-third the length of the plate 94 and is provided with an open end slot 102 of a size sufficient to expose the entire area of the aperture 101. Upon securing plates 94 and 95 in position on the lower surface of the lamp compartment 83, the rectangular aperture 101 in plate 94 is in register with the slightly wider aperture 82 in the lower wall of the compartment 83, disposed tranversely of the film 16.

The film guide strips 21 (FIGS. 5, 10, 11 and 12), which serve to support guide film strip 16 in its path of travel, are equally spaced either side of the light aperture 101, parallel therewith, and are adapted to retain the full width of the film in contact with the lower surface of the pressure plate 94. Each of the lower longitudinal edges 105 (FIG. 9) of the parallel walls of aperture 101 is beveled to conform to the curvature of the peripheral surface of the roller 64 and each chamfer is of a width of approximately ten-thousandths of an inch. Upon lowering the carriage 12 to effect intimate printing contact of the film strip 16 with the sensitized paper 62, exposure of the sensitized paper is restricted to an area corresponding to the size of the aperture 101 and the width of the chamfers 105 provides sufficient frictional contact of the film 16 with the paper 62 to enable movement of the paper with that of the film. To further enable and ensure suitable contact of the film strip 16 with the sensitized paper 62, an arcuate relief 106, conforming to the curvature of the surface of roller 64, is formed in plate 94 at each end of the light aperture 101.

After a character has been selected and moved near the exposure area and the film is pressed against the photosensitive strip, the two strips are moved together past the exposure light. During this contact printing phase it is important to maintain accuracy of alignment while the photosensitive strip is moved by the film strip. In order to maintain alignment, the position of the rubber drive sleeves 28 relative to the pressure area between the film strip and photosensitive strip is such that the driving force imposed by either sleeve 28 on the film strip is to the right of the center of the aperture 101 (FIG. 10) in plate 94. Thus, the driving force exerted by either sleeve 28 tends to produce a turning moment of the film strip about the pressure area, thereby urging the right, or inner, edge of the film strip against the vertically disposed walls of the guide channels 21. This effective relationship of the driving force to the pressure area will maintain accurate alignment of the film strip, even though the film strip and the driving mechanism therefor is moved laterally to the left from the position shown in FIG. 10 to a position wherein the film strip only partially overlies the photosensitive strip. The means for effecting lateral translation of the film strip relative to the photosensitive strip are not shown herein, but are shown and described in the above mentioned abandoned application.

As explained hereinbefore, guide yoke 70 serves to maintain the photosensitive strip 62 in alignment with the lower edge thereof (FIG. 7) against the guide bar 69. The tendency of the photosensitive strip to deviate from its normal course is caused by the movement of the film strip during a contact printing operation. Upon dropping the film strip into printing contact with the photosensitive strip, the secured portion of the plate 94, approximately one-third the length of the plate or the equivalent of slightly less than the minimum width of the overlap of the strips, provides the pressure area required to cause the photosensitive strip to move with the film strip. At the same time, the flexible portion of the plate is sufficiently rigid to maintain intimate contact between each of the strips for the reproduction of well defined characters.

Referring to FIG. 13, the relative forces acting on the photosensitive strip 62 are indicated as they would occur when the film strip is moved to the right in a superimposed position on the photosensitive strip. The result of the guide friction on the edges of the photosensitive strip is represented by the arrow R which falls in the center of the strip. Force F represents the motive force of the film strip which is the result of the friction forces transmitted by the pressure area of the plate 94. The distance between forces R and F produces a couple creating a clockwise turning moment in the photosensitive strip. Such a couple would tend to increase the normally 90° angle X and thereby tend to cause the strip to move out of contact with guide bar 69. Inasmuch as the flexible portion of the pressure plate 94 provides a slight frictional contact between each of the strips, the force exerted thereby is sufficient to move the total motive force to the position $F^1$ in FIG. 13. Thus, the couple produced by forces R and $F^1$ tends to make angle X less than 90°, thereby causing the photosensitive strip to run accurately against the guide bar 69.

For the reproduction of more than one line of copy, the film strip 16 and the motive controls therefore are displaced to the left in FIG. 10. In this condition, an overlapping relationship is formed between the film strip and the photosensitive strip. If this overlap is such that the force F in FIG. 13 is below force R and the strips are moving to the right, the turning moment produced in the photosensitive strip 62 tends to maintain the one edge of the strip against the guide bar 69. Upon movement of the strips 16 and 62 to the left in FIG. 13, the forces are reversed but, nevertheless, functioning in a similar manner to maintain accurate alignment of the photosensitive strip.

For the photographic printing operation, the film strip 16 is properly positioned by either motor 17 or 18 and/or wheel crank 36 for the desired letter, numeral or character to be printed. The carriage 12 is then lowered and the exposure lamp 90 is turned on substantially simultaneously therewith, followed by clockwise rotation of wheel crank 36 (FIG. 2) to move the film 16 to the right, as viewed in FIG. 5, which, due to the intimate contact of the film 16 with the sensitized paper 62, effects movement of the paper in its path of travel through discharge chute 68. The lamp 90 is then turned off and the carriage 12 is raised to the normal position shown in FIG. 5 wherein the film strip 16 is separated from the sensitized paper 62. This sequence of operation is repeated until the desired word or phrase is completed, whereupon the carriage 12 is lowered and, with the exposure lamp 90 turned off, wheel crank 36 is rotated in a clockwise direction, as viewed in FIG. 2, to move the sensitized paper 62 through the discharge chute 68 until the photographically reproduced images on paper 62 are beyond knife blade 107 (FIG. 5) of a conventional cutter mechanism. Thereafter, lever arm 108 (FIG. 1) is rocked clockwise to move blade 107 (FIG. 5) upwardly, thereby severing the paper 62, the printed portion of which may then be removed from the chute 68.

I claim:

1. In a photographic composing device having a base, a carriage supported on said base movable from a normally inoperative to an operative position, means adjustable to effect movement of said carriage to the operative position, a backing roller mounted in said base having a rolling contact with a photosensitive paper strip passing thereover, a pair of power-driven means mounted in said carriage securing the respective ends of an opaque film strip and operable to maintain said film strip taut, said film strip having a series of transparent characters formed thereon and being superimposed with relation to said paper strip normally spaced therefrom and movable longitudinally corresponding to the course of travel of said paper, a light tight compartment in said carriage providing a rectangular aperture of predetermined width in one wall thereof extending transversely of the path of travel of said film strip and parallel with the axis of said roller, a pair of guide strips positioned on each side of said compartment for maintaining said film strip in its path of travel relative to the aperture in said compartment, an exposure lamp in said compartment, a manual control means for moving said film strip, and means for providing photographic contact between said film strip and said paper strip, the combination comprising, a flexible pressure plate having substantially parallel planar surfaces and an exposure aperture extending therethrough of a width of about three-sixteenths of an inch and narrower than the width of the aperture in said light compartment, said plate being mounted with one of said surfaces adjacent the outer surface of said one wall of said compartment and the exposure aperture therein in register with the aperture in said compartment, said film strip having a sliding contact maintained by said guide strips with the other of said surfaces of said plate, the edges of the aperture in said plate at their point of intersection with said other surface being chamfered to conform to the curvature of said backing roller so that upon adjustment of said adjustable means to move said carriage to its operative position the film strip is moved into engagement with the paper strip thereby enabling movement of the paper strip with the film strip upon operation of said manual control means and the chamfer surfaces of the plate aperture providing a photographic contact of the film strip with the paper strip, and a guide means for maintaining lineal registry of said film strip with said paper strip during operation of said manual control means.

2. In the apparatus as defined in claim 1, the said guide means comprising, a guide plate mounted in said base adjacent one end of said backing roller in a plane at a right angle to the axis of said roller, a guide member resiliently mounted in said base adjacent the other end of said roller rockable in a plane parallel to the axis of said roller and movable axially of said roller, said guide member extending to each side of the axis of said roller, and a spring means associated with said guide member operable to maintain said guide member in engagement with one edge of the paper strip whereby the opposite edge is maintained in engagement with said guide plate.

3. In a photographic composing device having a light source, and means for feeding a film strip and a photosensitive strip in a superimposed relationship and in a common direction past said light source, the combination comprising a pair of conical rolls over which the film passes, each roll having a flange on the larger end thereof and a divergent axes of rotation on opposite sides of said light source extending transversely of the path of travel of said film strip, whereby upon rotation of said rolls one edge of the film is maintained in engagement with the said flanges to define the path of travel of said film, means for controlling rotation of said rolls to effect movement of said film strip in either direction, a pair of spaced parallel film guiding members, one either side of said light source and intermediate said conical rolls for maintaining accurate alignment of said one edge of said film strip as defined by said conical rolls upon movement of the film past said light source, means for controlling rotation of said conical rolls, a backing roller disposed adjacent said light source over which the photosensitive strip and superposed film strip pass, a pressure means interposed laterally of said film strip between said light source and said backing roller for maintaining said film strip and said photosensitive strip in frictional contact for enabling movement of the said photosensitive strip by said film strip, a guide bar disposed at a right angle to the axis of said backing roller adjacent one end of the roller for guiding said photosensitive strip in a path of travel corresponding to that of the film strip, and a guide yoke laterally movable and rockable in a plane parallel to the axis of said backing roller and extending to each side of the axis of said yoke having the respective end portions thereof in contact with one edge of said photosensitive strip, and a spring means associated with said guide yoke intermediate the ends thereof for resiliently urging the end portions of said yoke against the one edge of said photosensitive strip thereby maintaining the opposite edge of the strip against the said guide bar.

4. In a device of the character described in claim 3, wherein said pressure means comprises a rectangular pressure plate having a minor and major portion and an aperture in said plate of a length substantially that of the width of the film through which the light passes, the minor portion of said plate being rigid and the major portion being flexible, the rigid portion of said plate causing a friction load on said film strip between said guiding members adjacent the guided edge of the film strip upon operation of said controlling means and the flexible portion of said plate counteracting a turning moment induced in the photosensitive strip by the motive force in parallel opposition to and coplanar with the frictional resistance forces when the motive force is nearer than the resistance forces to the edge of the photosensitive strip guided by said guide yoke thereby effecting operation of said guide yoke.

5. In a device of the character described in claim 4, wherein the minor portion of said plate is of the order of about one-third of the length of said plate.

6. In a photographic composing device having a base member, a carriage shiftable on said base member, a light source in said carriage, means for feeding a film strip and a photosensitive strip in a superimposed relationship and in a common direction past said light source including a pair of rollers over which the film strip passes, a flange on one end of each of said rollers, said rollers being disposed either side of said light source and operable upon rotation thereof to maintain one edge of said film strip in contact with said flanges, a pair of parallel guide members spaced equally either side of said light source intermediate said rollers effective to maintain accurate alignment of said one edge of said film strip in its path of travel between said rollers, a backing roller in said base member adjacent said light source over which the photosensitive strip passes in its path of travel, means for guiding said photosensitive strip to accurately maintain one edge thereof in an alignment corresponding to the alignment of said one edge of said film strip, means for shifting said carriage moving said film strip laterally to each of a plurality of overlapping positions relative to said photosensitive strip, and means for enabling the movement of said photosensitive strip by said film strip, the combination comprising a pressure plate having a minor length portion and a major length portion supported on said carriage and interposed between said light source and said backing roller operable to maintain said film strip in frictional contact with said photosensitive strip, said minor length portion of said plate being rigid and of a length of the order of about the width of the minimum overlap of said film strip and said photosensitive strip in the extreme shifted position of said carriage and said major length portion being flexible, the minor length portion providing the frictional force for enabling the photosensitive strip to be moved by the film strip and the major length portion being flexible to maintain intimate contact of the strips during a composing operation.

7. A photographic composing device comprising a light source, means for feeding a film strip and a sensitized paper strip in a superimposed relationship and in a common direction past said light source, a backing roller over which the said film strip and paper strip pass during operation of said feeding means, and a pressure plate disposed between said light source and said backing roller extending transversely of the path of travel of said superimposed strips operable to maintain photographic contact of said strips against said backing roller and to enable movement of said strips by said feeding means, said pressure plate having a narrow aperture therein with corresponding edges of the aperture beveled to conform to the curvature of the surface of said backing roller for contact with the uppermost of said strips whereby the exposure area is restricted to the lines of contact for the printing of an image.

8. In a photographic composing device having a base member, a carriage shiftable on said base member, a light source in said carriage movable therewith, means disposed within said carriage for feeding a film strip past said light source and in a superimposed relationship to a photosensitive strip, means supporting the photosensitive strip for movement past said light source in a common direction with said film strip, means for guiding said film strip in its path of travel, an aligning means resiliently operable to maintain accurate alignment of said photosensitive strip in its path of travel relative to said film strip, means for shifting said carriage to effect an overlapping relationship of the strips, and means for enabling a corresponding movement of said photosensitive strip with said film strip, the combination comprising a flexible pressure plate within said carriage extending laterally of the film strip and disposed between said light source and said supporting means for the passage of the strip between said plate and said supporting means, one portion of said plate being rigidly secured to said carriage for movement of the plate therewith and of a length of the order of about the width of the minimum overlap of the strips in the extreme shifted position of said carriage operable to effect frictional contact of the film strip with the photosensitive strip for the movement of the latter strip by the former strip upon operation of said feeding means, said pressure plate having an aperture therein effective to restrict the exposure area to that defined by the walls of the aperture upon frictional contact of said plate with the film strip.

References Cited by the Examiner
UNITED STATES PATENTS

| | | | |
|---|---|---|---|
| 1,237,239 | 8/17 | Bunnell | 92—4.5 |
| 2,487,476 | 11/49 | Pratt | 88—24 |
| 2,669,398 | 2/54 | Olson | 242—55 |
| 2,780,151 | 2/57 | Borisof | 95—4.5 |

FOREIGN PATENTS

| | | |
|---|---|---|
| 1,073,864 | 1/60 | Germany. |

NORTON ANSHER, *Primary Examiner.*

JOHN M. HORAN, *Examiner.*